United States Patent
Inoue (10) Patent No.: US 9,392,030 B2
(45) Date of Patent: Jul. 12, 2016

(54) COMMUNICATION APPARATUS, COMMUNICATION APPARATUS CONTROL METHOD, AND STORAGE MEDIUM FOR DATA COMMUNICATION USING A CALL CONTROL SERVER

(71) Applicant: CANON KABUSHIKI KAISHA, Tokyo (JP)

(72) Inventor: Go Inoue, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 231 days.

(21) Appl. No.: 14/290,790

(22) Filed: May 29, 2014

(65) Prior Publication Data

US 2014/0359141 A1  Dec. 4, 2014

(30) Foreign Application Priority Data

May 30, 2013  (JP) .................................. 2013-114420

(51) Int. Cl.
  *G06F 15/16*  (2006.01)
  *H04L 29/06*  (2006.01)

(52) U.S. Cl.
  CPC .......... *H04L 65/1006* (2013.01); *H04L 65/105* (2013.01); *H04L 65/1069* (2013.01)

(58) Field of Classification Search
  CPC .............. H04L 65/1006; H04L 65/105; H04L 65/1069
  See application file for complete search history.

(56) References Cited

U.S. PATENT DOCUMENTS

| | | | |
|---|---|---|---|
| 9,100,596 B2 * | 8/2015 | Ushida | H04N 1/34 |
| 2007/0258111 A1 * | 11/2007 | Ooizumi | H04N 1/00214 358/402 |
| 2012/0254072 A1 * | 10/2012 | Ushida | H04N 1/34 705/418 |

FOREIGN PATENT DOCUMENTS

JP  2005-094662 A  4/2005

* cited by examiner

*Primary Examiner* — Moustafa M Meky (74) *Attorney, Agent, or Firm* — Canon USA, Inc., IP Division (57) ABSTRACT

There is provided a multifunction peripheral (MFP) configured to perform data communication using a session initiation protocol (SIP) server, which includes a main controller and a sub controller. The sub controller performs a 100Trying response as to a received INVITE, and also instructs activation of the main controller. Also, the main controller performs a 180Ringing response following the 100Trying after activation in response to the instruction from the sub controller, and performs data communication using a session established between the main controller and a partner device.

14 Claims, 11 Drawing Sheets

1. SENDING DESTINATION MAC ADDRESS OF RECEIVED PACKET
   AGREES WITH THE OWN DEVICE MAC ADDRESS
2. SNMP SEARCH BROADCAST PACKET
3. SLP SEARCH MULTICAST PACKET

COMMUNICATION APPARATUS, COMMUNICATION APPARATUS CONTROL METHOD, AND STORAGE MEDIUM FOR DATA COMMUNICATION USING A CALL CONTROL SERVER

BACKGROUND OF THE INVENTION

1. Field of the Invention

The present invention relates to a communication apparatus, a communication apparatus control method, and a storage medium, which perform data communication using a call control server.

2. Description of the Related Art

Heretofore, a method has been known in which a session is established using a call control protocol such as session initiation protocol (SIP) or the like to perform data communication. SIP is a protocol used for communication such as Internet Protocol FAX (IPFAX) or the like (see Japanese Patent Laid-Open No. 2005-094662).

Figure 10:
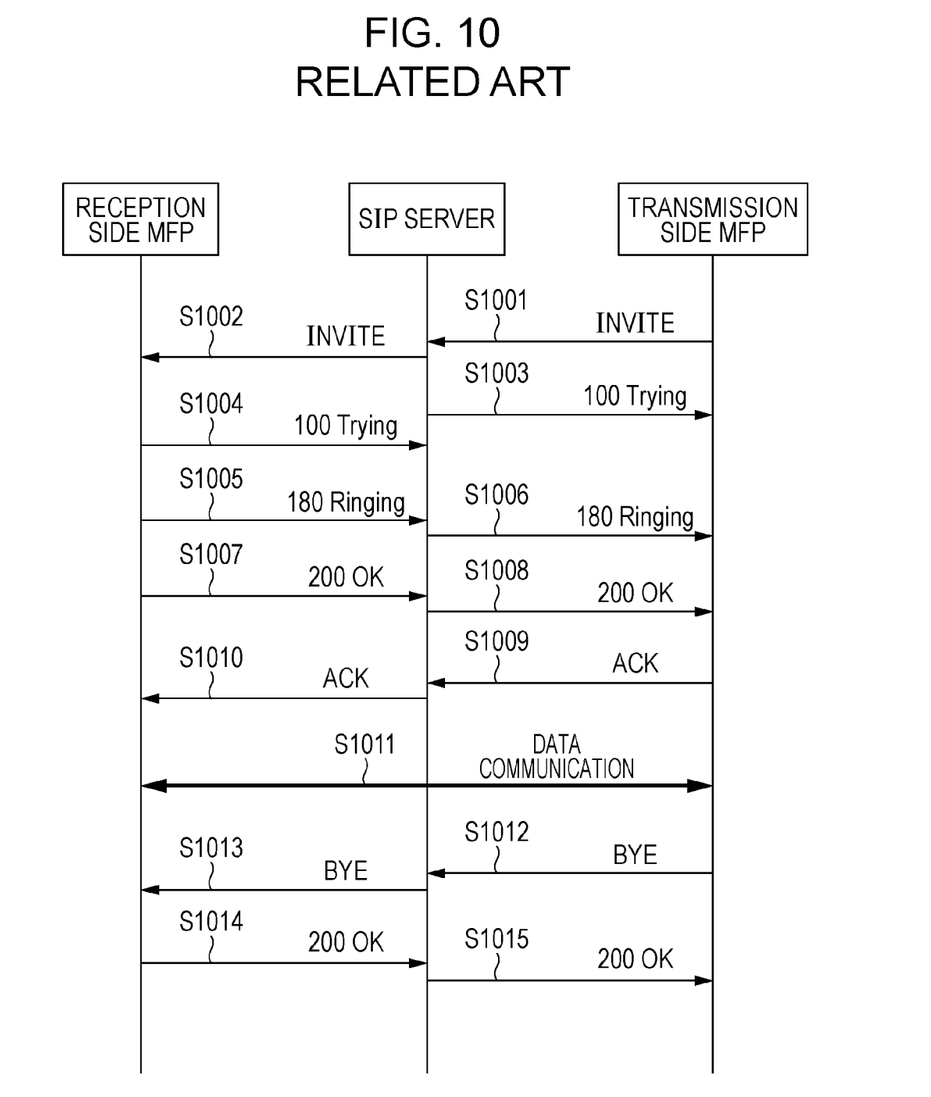
FIG. 10 is a communication sequence chart according to the related art.

FIG. 10 illustrates a communication sequence using an existing SIP. FIG. 10 describes a case where a transmission side multifunction peripheral (MFP) and a reception side MFP perform call control via an SIP server, and the transmission side MFP facsimile-transmits image data to the reception side MFP, as an example.

In step S1001, the transmission side MFP transmits "INVITE" to the SIP server. "INVITE" is a session initiation request conforming to SIP. The SIP server which has received the "INVITE" transfers the "INVITE" to the reception side MFP in step S1002, and also returns "100Trying" to the transmission side MFP in step S1003. "100Trying" means that processing according to "INVITE" is being executed.

In step S1004, the reception side MFP which has received the "INVITE" returns "100Trying" to the SIP server. In step S1005, the reception side MFP returns "180Ringing" to the SIP server. "180Ringing" means that a phone is currently being called, and means that a ringback tone is ringing in the case that the device on the reception side is an IP phone. The SIP server which has received the "180Ringing" from the reception side MFP transfers the "180Ringing" to the transmission side MFP in step S1006.

In step S1007, the reception side MFP returns "200OK" to the SIP server. The "200OK" mentioned here means that the reception side MFP has gone into a state in which a session is ready to be established, and in the case that the reception-side device is an IP phone, means that the user has picked up the receiver (off-hooked). The SIP server which has received the "200OK" from the reception side MFP transfers "200OK" to the transmission side MFP in step S1008.

In step S1009, the transmission side MFP transmits "ACK" to the SIP server. "ACK" is a confirmation response as to the "200OK". The SIP server which has received the "ACK" from the transmission side MFP transfers the "ACK" to the reception side MFP in step S1010. According to the above processing, a session has been established between the transmission side MFP and the reception side MFP, and data communication (transmission of facsimile data) is performed in step S1011. Note that the data communication in step S1011 is performed by peer to peer without going through the SIP server.

In step S1012, the transmission side MFP transmits "BYE" to the SIP server. "BYE" means communication termination (request for session disconnection). The SIP server which has received the "BYE" from the transmission side MFP transfers the "BYE" to the reception side MFP in step S1013. The reception side MFP returns "200OK" to the SIP server in step S1014. The "200OK" mentioned here means that disconnection of the session has been successful. The SIP server which has received the "200OK" from the reception side MFP transfers the "200OK" to the transmission side MFP in step S1015.

According to the above sequence, the transmission side MFP and reception side MFP can perform call control via the SIP server, and facsimile-transmit image data from the transmission side MFP to the reception side MFP.

MFPs in recent years include, in order to reduce power consumption at the time of standby, a sleep mode (power-saving mode) with smaller power consumption than that of a standby mode (normal power mode). Further, the MFPs can also automatically go into the sleep mode in the case that long period of time has elapsed without operations or communication by a user. In a state going into the sleep mode, power supply to the main controller is stopped while continuing power supply to the sub controller (communication unit) of the MFP. Since power supply to the sub controller is continued, the main controller can be activated (return to the normal power mode) in response to a packet from a network.

On the other hand, according to the above SIP technology, a call connection may be cancelled after the SIP server transfers the "INVITE" to the reception side device in the case that there is no response from the reception side device within predetermined time. There may be a case where this predetermined time is set to four seconds, depending on the types of SIP server. Description will be made regarding a problem that will be caused in the case that an MFP including the above sleep mode is used in such an environment, with reference to FIG. 11.

Figure 11:
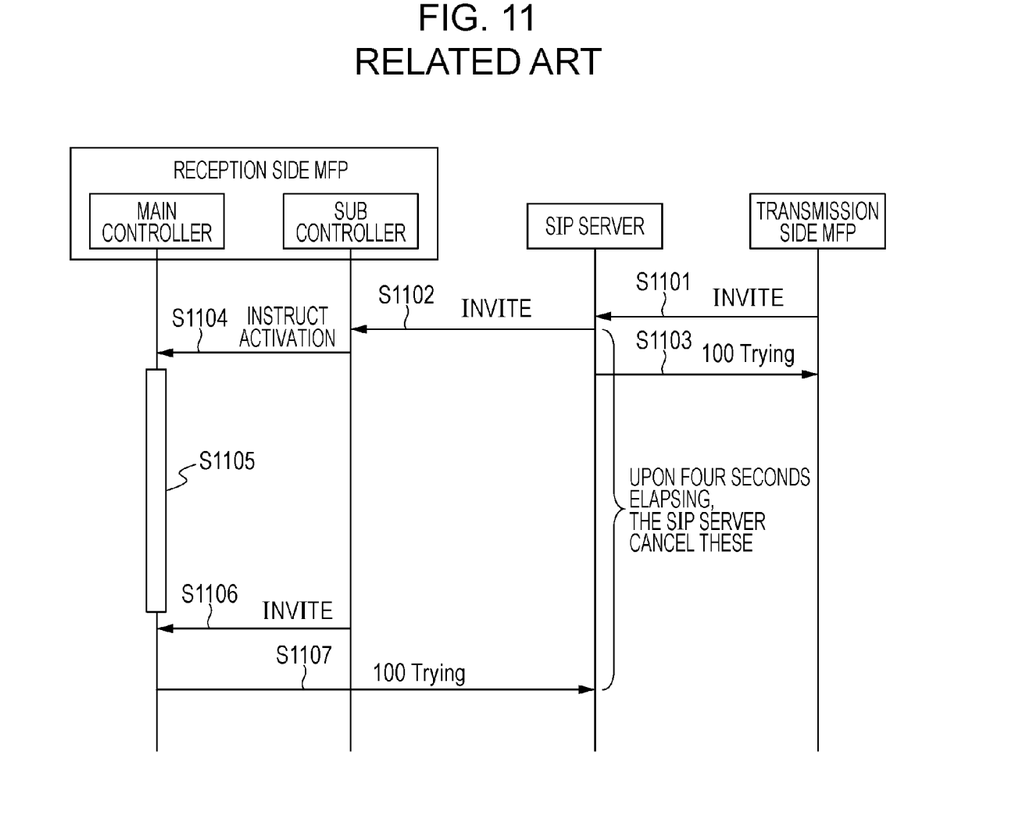
FIG. 11 is a communication sequence chart according to the related art.

In step S1101, the transmission side MFP transmits "INVITE" to the SIP server. The SIP server which has received the "INVITE" transfers the "INVITE" to the reception side MFP in step S1102, and also returns "100Trying" to the transmission side MFP in step S1103.

In step S1104, the sub controller of the reception side MFP which has received the "INVITE" from the SIP server instructs the main controller to perform activation. In step S1105, the main controller performs activation processing. Upon the main controller being activated, in step S1106 the sub controller transfers the "INVITE" to the main controller. The main controller which has received the "INVITE" returns "100Trying" to the SIP server in step S1107.

Here, it may take five to six seconds for the activation processing of the main controller of the MFP in step S1105. In this case, it takes four or more seconds since the "INVITE" in step S1102 until the "100Trying" in step S1107, and consequently, the call connection is cancelled by the SIP server. In this case, the processing from the transmission of the "INVITE" in step S1101 has to be performed again, which is poor in operating efficiency.

SUMMARY OF THE INVENTION

A communication apparatus according to an embodiment of the present invention configured to perform data communication using a call control server, includes: a first controller; and a second controller. The second controller includes a reception unit configured to receive an initiation request for a session, a first response unit configured to perform first response for the initiation request that the reception unit has received, and an activation instruction unit configured to instruct activation of the first controller in response to reception of the initiation request by the reception unit. The first controller includes a second response unit configured to perform second response subsequent to the first response after the first controller is activated in response to the instruction by the activation instruction unit, and a communication controller configured to perform data communication using a session established between the communication controller and a partner device after the second response unit performs the second response.

Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings. Note that the following embodiments do not restrict the invention according to the scope of Claims, and also all of combinations of features described in the embodiments are not necessarily essential in the solution proposed in Claims.

First Embodiment

Figure 1:
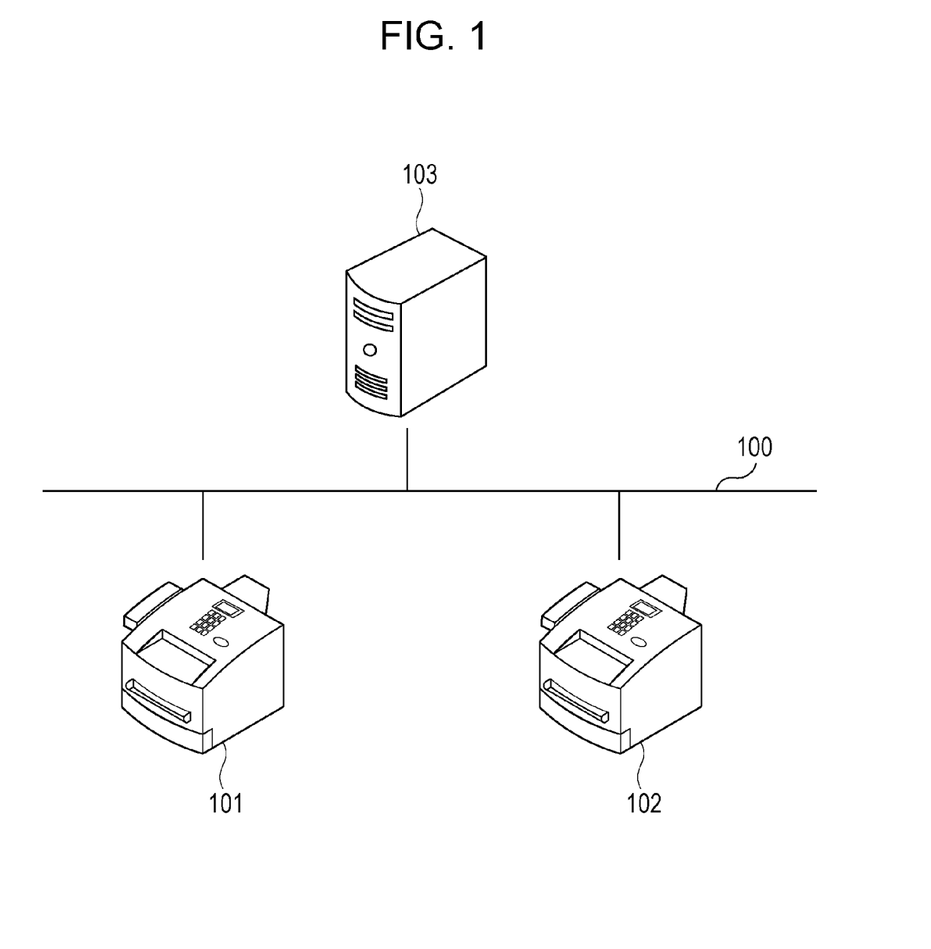
FIG. 1 is an overall network diagram according to an embodiment of the present invention.

A first embodiment of the present invention will be described. FIG. 1 is an overall network diagram. MFPs 101 and 102, and a session initiation protocol (SIP) server 103 are connected in a mutually communicable manner over a local area network (LAN) 100 which is an IP network. The MFPs 101 and 102 are an example of communication apparatuses, and can also be referred to as a communication system. Now, though MFPs will be described as an example, personal computers, phones, servers, gateways, routers, and so forth are also included in the communication apparatuses. The SIP server 103 is an example of call control servers. A server compatible with a call control protocol other than SIP is also included in the call control servers.

Figure 2:
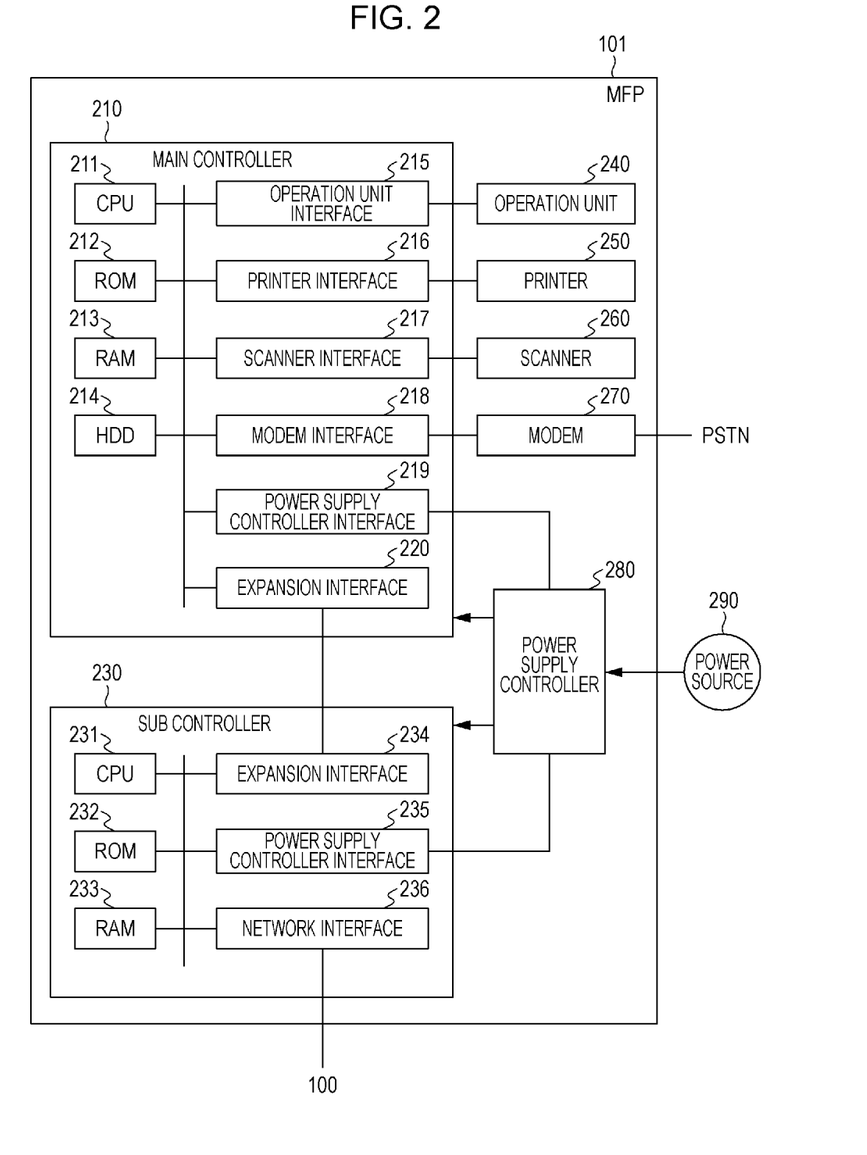
FIG. 2 is a hardware configuration diagram of a multifunction peripheral (MFP) according to an embodiment of the present invention.

FIG. 2 is a hardware configuration diagram of the MFP 101. A main controller (first controller) 210 including a central processing unit (CPU) 211 controls the operation of the overall MFP 101. The CPU 211 reads out a control program stored in ROM 212 to perform various types of control such as scanning, printing, communication, and so forth. RAM 213 is used as a temporarily storage area such as the main memory, work area, and so forth of the CPU 211. Note that, though let us say that the main controller 210 is configured so that the single CPU 211 executes various types of processing illustrated in a later-described flowchart using single memory (RAM 213 or HDD 214), the main controller 210 may have another mode. For example, the various types of processing illustrated in the flowchart may also be executed cooperation with multiple CPUs and a plurality of random access memory (RAM) devices, or a hard disk drive (HDD).

The HDD 214 stores image data and various programs. An operation unit interface 215 connects an operation unit 240 and the main controller 210. The operation unit 240 includes a liquid crystal display unit having a touch panel function, a keyboard, and so forth, and undertakes a role as an acceptance unit configured to accept operations, input, and instructions by a user.

A printer interface 216 connects a printer 250 and the main controller 210. Image data to be printed by the printer 250 is transferred from the main controller 210 via the printer interface 216, and is printed on a recording medium by the printer 250. The MFP 101 can print image data facsimile-received at the printer 250 using a later-described method.

A scanner interface 217 connects a scanner 260 and the main controller 210. The scanner 260 reads an image on document to generate image data, and input to the main controller 210 via the scanner interface 217. The MFP 101 can facsimile-transmit the image data generated at the scanner 260 using a later-described method.

A modem interface 218 connects a modem 270 and the main controller 210. The modem 270 executes G3 facsimile communication via PSTN. A power supply controller interface 219 connects a power supply controller 280 and the main controller 210. An expansion interface 220 connects a sub controller 230 and the main controller 210.

The sub controller (second controller) 230 including a CPU 231 undertakes a role serving as a communication unit of the MFP 101. The CPU 231 reads out a control program stored in read only memory (ROM) 232 to perform communication control. RAM 233 is used as a temporary storage area such the main memory, work area, and so forth of the CPU 231. Note that, though let us say that the sub controller 230 is configured so that the single CPU 231 executes various types of processing illustrated in a later-described flowchart using a single memory device (RAM 233), the sub controller 230 may have another mode. For example, the various types of processing illustrated in the flowchart may also be executed cooperation with multiple CPUs, and multiple RAM devices.

The expansion interface 234 connects the main controller 210 and sub controller 230. A power supply controller interface 235 connects the power supply controller 280 and sub controller 230. A network interface 236 connects the sub controller 230 (MFP 101) to the LAN 100. The main controller 210 communicates with an external device (MFP102, SIP server 103, etc.) over the LAN 100 via the sub controller 230.

The power supply controller 280 supplies the power from a power source 290 to the main controller 210 and sub controller 230. The MFP 101 has two power modes of a standby mode (normal power mode) and a sleep mode (power-saving mode), and can operate by switching these. In the case that long period of time has elapsed without operations or communication by a user in the state of the standby mode, the MFP 101 automatically goes into the sleep mode. In the state of the sleep mode, while power supply to the sub controller 230 is continued, power supply to the main controller 210 is stopped. Thus, the power consumption of the overall MFP 101 is reduced.

Note that power supply to part of the main controller 210 may be continued in the sleep mode. Also, power supply to part of the sub controller 230 may be stopped in the sleep mode. Also, the MFP 101 may have a power mode other than the above two power modes.

The MFP 102 has the same configuration as that of the MFP 101, and accordingly, description will be omitted. However, the MFP 102 may have a configuration different from that of the MFP 101.

Figure 3:
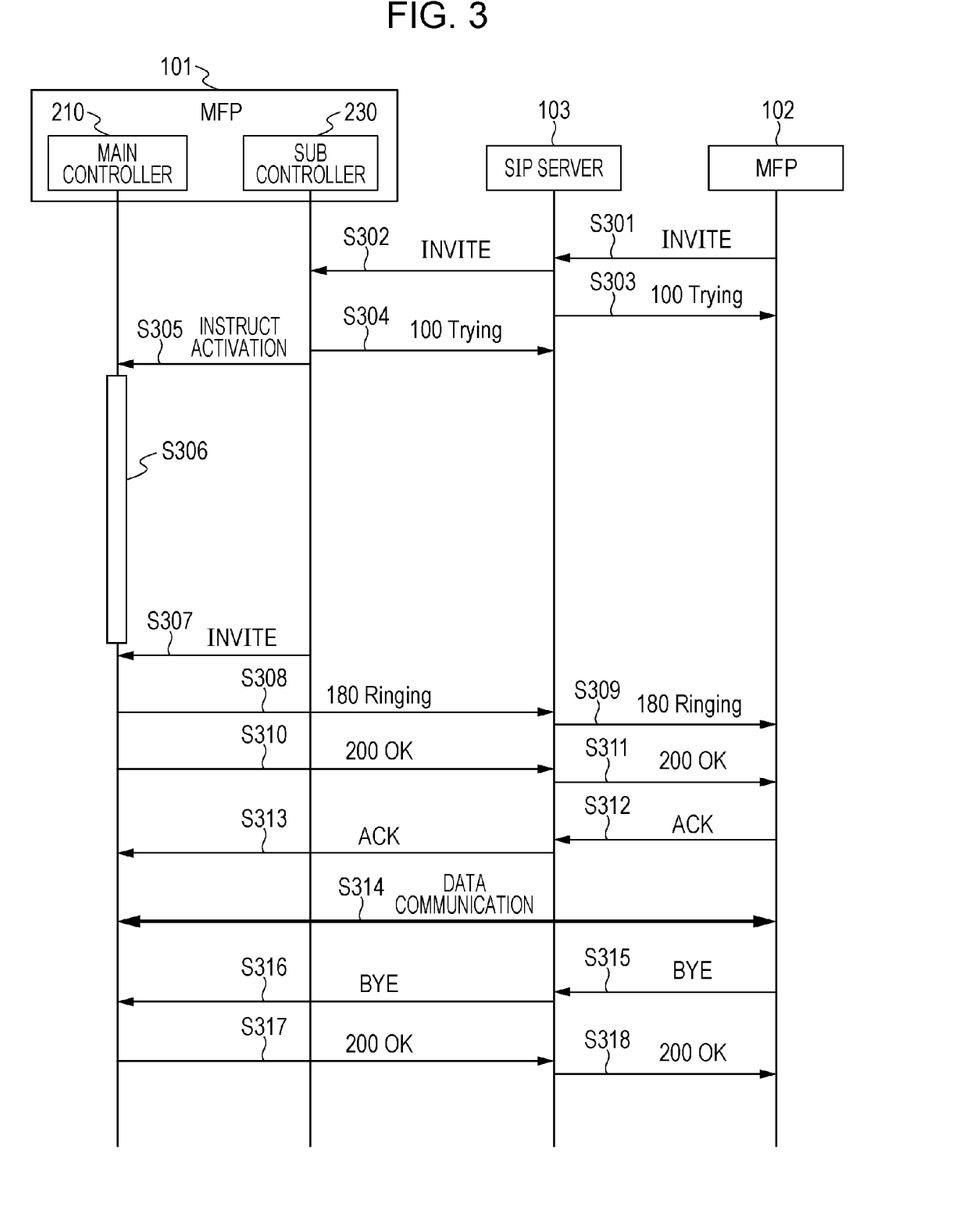
FIG. 3 is a communication sequence chart according to an embodiment of the present invention.

FIG. 3 is a diagram illustrating a communication sequence in the case that "INVITE" has been received from the MFP 102 in a state in which the MFP 101 is in the sleep mode.

In step S301, the MFP 102 transmits "INVITE" to the SIP server 103. The SIP server 103 which has received the "INVITE" transfers the "INVITE" to the MFP 101 in step S302, and also returns "100Trying" to the MFP 102 in step S303. "100Trying" indicates that the processing is being executed.

The sub controller 230 of the MFP 101 which has received the "INVITE" from the SIP server 103 returns "100Trying" to the SIP server 103 in step S304, and also instructs activation to the main controller 210 in step S305. The main controller 210 which has received this instruction performs activation processing in step S306. Note that an activation instruction may be performed in step S305 before returning "100Trying" to the MFP 102 in step S304.

Thus, the sub controller 230 returns "100Trying" to the MFP 102 as a proxy of the main controller 210 before the activation of the main controller 210 is completed, thereby enabling time from "INVITE" in step S302 to "100Trying" in step S304 to be reduced. Thus, a time-out error at the SIP server 103 can be avoided.

Upon the activation of the main controller 210 being completed, in step S307 the sub controller 230 transfers the "INVITE" to the main controller 210. In step S308, the main controller 210 returns "180Ringing" to the SIP server 103. Note that, after the main controller 210 is activated, packets that the main controller 210 transmits/receives between itself and the SIP server 103 are, though passing through the sub controller 230, substantially directly transmitted/received between the main controller 210 and SIP server 103. That is to say, the sub controller 230 undertakes a role configured to relay packets. The SIP server 103 which has received the "180Ringing" from the MFP 103 transfers the "180Ringing" to the MFP 102 in step S309.

In step S310, the main controller 210 returns "200OK" to the SIP server 103. The SIP server 103 which has received the "200OK" from the MFP 101 transfers the "200OK" to the MFP 102 in step S311. Note that the main controller 210 may perform response of the "200OK" in step S310 omitting the "180Ringing" in step S308.

In step S312, the MFP 102 transmits "ACK" to the SIP server 103. The SIP server 103 which has received the "ACK" from the MFP 102 transfers the "ACK" to the MFP 101 in step S313. According to the above processing, the session between the MFP 101 and MFP 102 has been established, and data communication (reception of facsimile data by the MFP 101) is performed in step S314. Note that the data communication in step S314 is performed by peer to peer without passing through the SIP server 103.

In step S315, the MFP 102 transmits "BYE" to the SIP server 103. The SIP server 103 which has received the "BYE" from the MFP 102 transfers the "BYE" to the MFP 101 in step S316. The main controller 210 returns "200OK" to the SIP server 103 in step S317. The SIP server 103 which has received the "200OK" from the MFP 101 transfers "200OK" to the MFP 102 in step S318.

According to the above sequence, even in a state in which the MFP 101 is in the sleep mode, the MFP 101 and MFP 102 can perform call control via the SIP server 103 and facsimile-transmit image data from the MFP 102 to the MFP 101.

Figure 4:
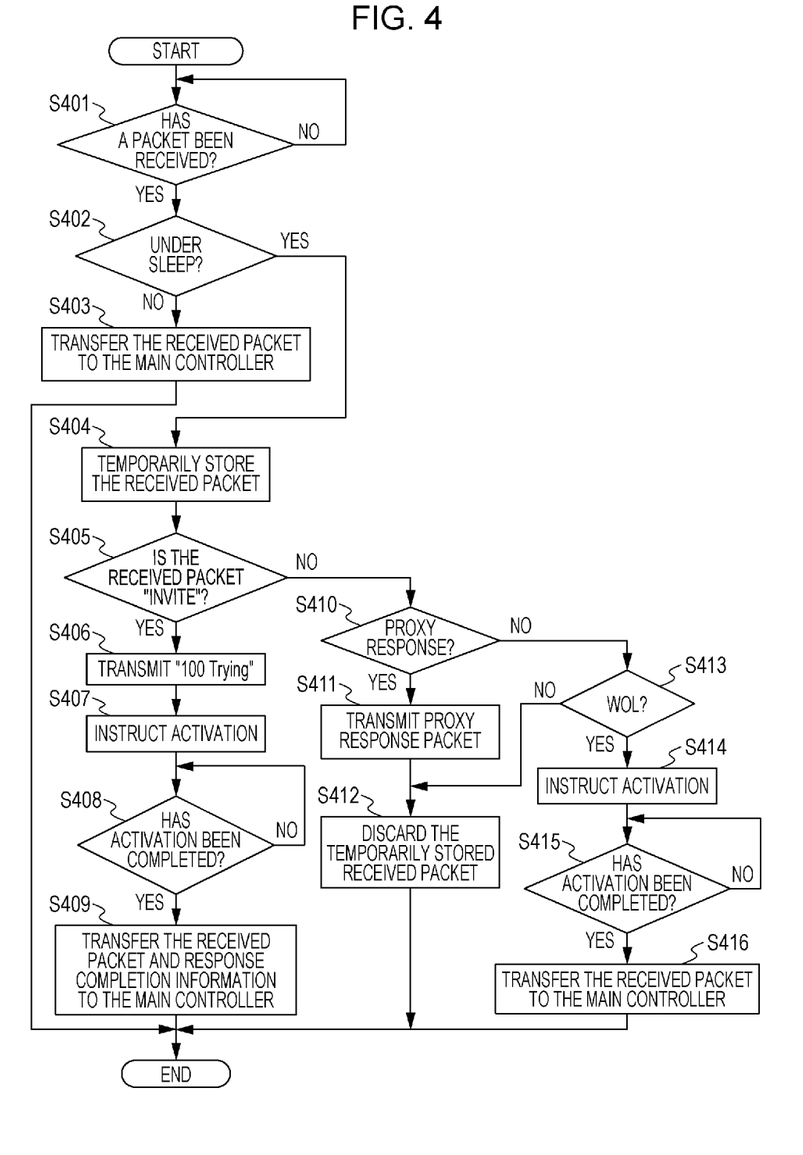
FIG. 4 is a flowchart illustrating operation of a sub controller according to an embodiment of the present invention.

FIG. 4 is a flowchart for describing the operation of the MFP 101. The operations (steps) illustrated in the flowchart in FIG. 4 are realized by the CPU 231 of the sub controller 230 executing the control program stored in the ROM 232.

In step S401, the sub controller 230 determines whether or not a packet has been received from the LAN 100. In the case of having received a packet, the sub controller 230 proceeds to step S402, and in the case of having received no packet, awaits until a packet is received. In step S402, the sub controller 230 determines whether or not the MFP 101 is now in the state of the sleep mode. In the case that the MFP 101 is not in the sleep mode, the sub controller 230 proceeds to step S403, transfers the received packet to the main controller 210, and ends the processing.

Figure 5A:
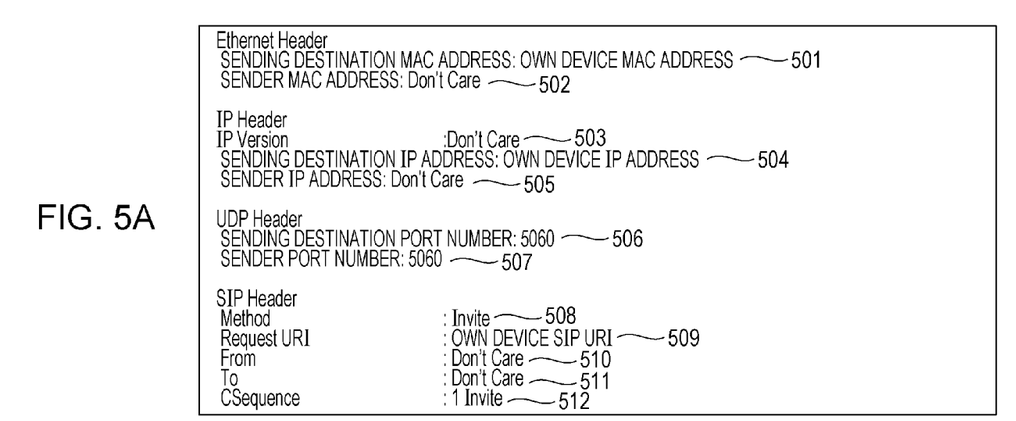
FIGS. 5A and 5B are diagrams illustrating proxy response information according to an embodiment of the present invention.
Figure 5B:
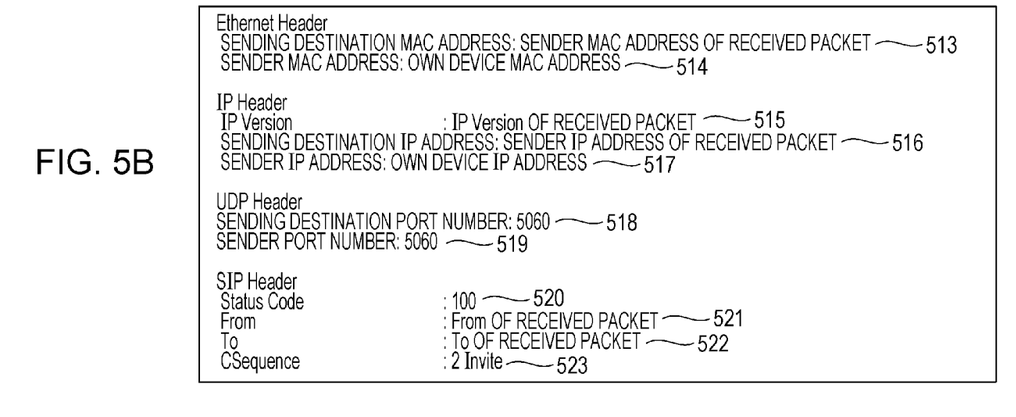

On the other hand, in the case that the MFP 101 is in the sleep mode, the sub controller 230 proceeds to step S404, and temporarily stores the received packet. In step S405, the sub controller 230 determines whether or not the received packet is "INVITE". Details of this determination will be described later with reference to FIG. 5.

As a result of the determination, in the case that the received packet is "INVITE", the sub controller 230 proceeds to step S406, and otherwise, to step S410. In step S406, the sub controller 230 transmits "100Trying" to the SIP server 103 (corresponds to step S304 in FIG. 3). In step S407, the sub controller 230 instructs activation to the main controller 210.

In step S408, the sub controller 230 determines whether or not the activation of the main controller 210 has been completed. In the case that the activation has been completed, the sub controller 230 proceeds to step S409, and in the case that the activation has not been completed, awaits until the activation is completed. In step S409, the sub controller 230 transfers the received packet temporarily stored in step S404 and response completion information to the main controller 210. The response completion information is information for notifying the main controller 210 of that the response to the received packet (transmission of the "100Trying" in step S406) has been completed.

Figure 6A:
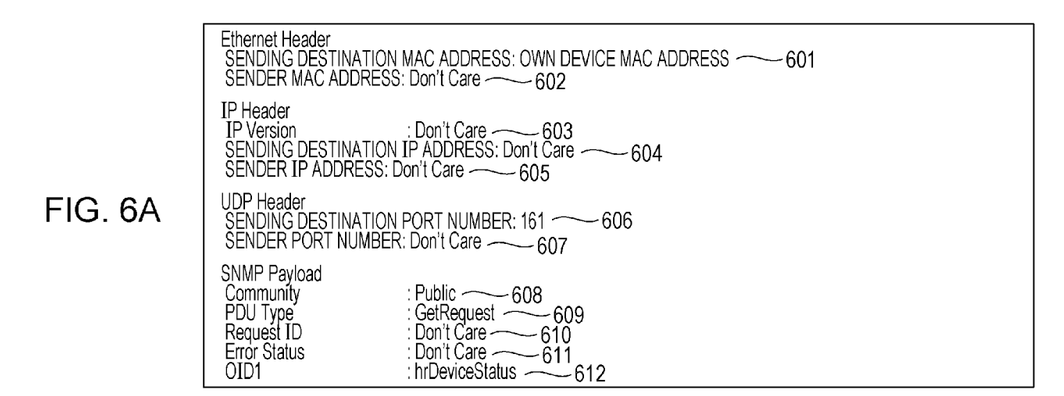
FIGS. 6A and 6B are diagrams illustrating proxy response information according to an embodiment of the present invention.
Figure 6B:
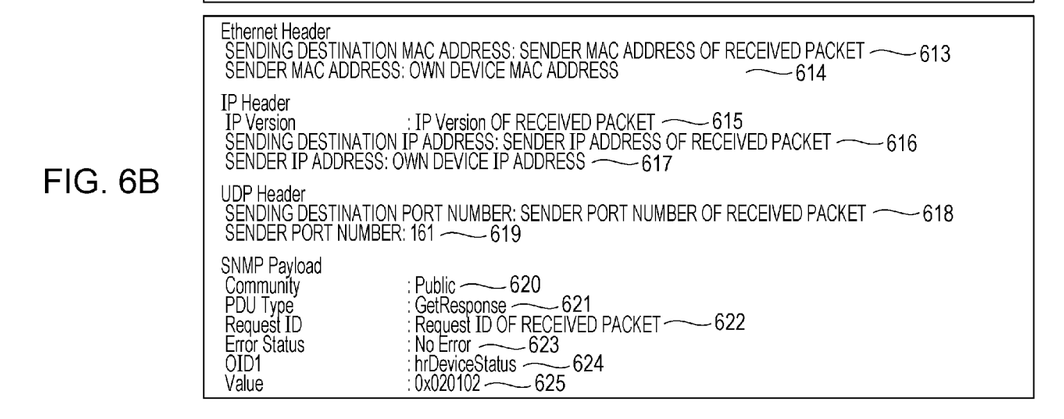

In step S410, the sub controller 230 determines whether or not the received packet satisfies conditions for proxy response. Details of this determination will be described later with reference to FIG. 6. In the case that the received packet satisfies conditions for proxy response, the sub controller 230 proceeds to step S411, and in the case that received packet does not satisfy conditions for proxy response, proceeds to step S413.

In step S411, the sub controller 230 responds to the received packet as a proxy of the main controller 210. Next, in step S412 the sub controller 230 discards the received packet temporarily stored in step S404, and ends the processing. Thus, the sub controller 230 responds to the packet as a proxy of the main controller 210, thereby eliminating necessity to frequently activate the main controller 210, and enhancing power-saving effects.

In step S413, the sub controller 230 determines whether or not the received packet satisfies conditions for Wake-on-LAN (WOL). WOL is a function for activating a computer connected to a LAN from another computer via a network. Details of the determination in step S413 will be described later with reference to FIG. 7. In the case that the received packet satisfies conditions for WOL, the sub controller 230 proceeds to step S414, and in the case that the received packet does not satisfy conditions for WOL, proceeds to step S412.

In step S414, the sub controller 230 instructs activation to the main controller 210. In step S415, the sub controller 230 determines whether or not the activation of the main controller 210 has been completed. In the case that the activation has been completed, the sub controller 230 proceeds to step S416, and in the case that the activation has not been completed, awaits until the activation is completed. In step S416, the sub controller 230 transfers the received packet temporarily stored in step S404 to the main controller 210. Here, in contrast to step S409, the sub controller 230 does not transmit the response completion information.

In the case that the sub controller 230 has proceeded to step S413 from step S412, the sub controller 230 discards the received packet temporarily stored in step S404, and ends the processing.

FIGS. 5A and 5B are diagrams for describing a method for realizing the determination in step S405 and the transmission of "100Trying" in step S406 in FIG. 4 in detail. Information illustrated in FIGS. 5A and 5B is stored in the ROM 232.

FIG. 5A is a packet pattern for determining whether or not the packet received in step S401 is "INVITE". In the case of having received a packet matching the pattern illustrated in FIG. 5A, the sub controller 230 determines that "INVITE" has been received.

Items 501 and 502 are the sending destination media access control (MAC) address and sender MAC address in an Ethernet (registered trademark) header. In the example illustrated in FIG. 5A, though it is a condition that the MAC address of itself (i.e., MFP 101) is specified as the sending destination MAC address, the sender MAC address may be any address.

Items 503 to 505 are the Internet protocol (IP) Version, sending destination IP address, and sender IP address in an IP Header. In the example illustrated in FIG. 5A, it is a condition that the IP address thereof is specified as the sending destination IP address, and the IP Version and sender IP address may be anything.

Items 506 and 507 are the sending destination port number and sender port number in a UDP Header. In the example illustrated in FIG. 5A, it is a condition that both of the sending destination port number and sender port number are 5060.

Items 508 to 512 are information indicating the Method, Request uniform resource identifier (URI), From, To, CSequence in a SIP Header. Method is information indicating a type, such as "INVITE", "ACK", "BYE", or the like. In the example illustrated in FIG. 5A, it is a condition that Invite is specified as Method. Also, it is a condition that the SIP URI of itself is specified as Request URI. Also, it is a condition that "1 Invite" is specified as CSequence. From and To may be anything.

FIG. 5B illustrates the data of "100Trying" transmitted in step S406. The sender MAC address of the received packet is described in the sending destination MAC address in Item 513. Its own MAC address is described in the sender MAC address in Item 514.

The IP Version of the received packet is described in the IP Version in Item 515. The sender IP address of the received packet is described in the sending destination IP address in Item 516. Its own IP address is described in the sender IP address in Item 517.

5060 is described in both of the sending destination port number in Item 518 and the sender port number in Item 519. 100 is described in the StatusCode in Item 520. The From of the received packet is described in the From in Item 512. The To of the received packet is described in the To in Item 513. "2 Invite" is described in CSequence.

FIGS. 6A and 6B are diagrams for describing a method for realizing the determination in step S410 in FIG. 4 and the transmission of the proxy response packet in step S411 in detail. Information indicating in FIGS. 6A and 6B is stored in the ROM 232.

FIG. 6A is a packet pattern for determining whether or not the packet received in step S401 satisfies conditions for proxy response. In the case of having received a packet matching the pattern illustrated in FIG. 6A, the sub controller 230 determines that the packet which is a proxy response target has been received.

Items 601 and 602 are the sending destination MAC address and sender MAC address in an Ethernet (registered trademark) Header. In the example illustrated in FIG. 6A, though it is a condition that the MAC address of itself (i.e., MFP 101) is specified as the sending destination MAC address, the sender MAC address may be any address.

Items 603 to 605 are the IP Version, sending destination IP address, and sender IP address in an IP Header. In the example illustrated in FIG. 6A, either of the items may be anything.

Items 606 and 607 are the sending destination port number and sender port number in a UDP Header. In the example illustrated in FIG. 6A, it is a condition that the sending destination port number is 161, and the sender port number may be any number.

Items 608 to 612 are the Community, protocol data unit (PDU) Type, Request URI, Error Status, and OID1 in a simple network management protocol (SNMP) payload. SNMP is a protocol for managing a network. In the case of the present embodiment, the MFP 101 serves as an SNMP agent, receives an inquiry from a personal computer (PC) (SNMP manager) over the LAN 100, and returns the device information of the MFP 101 to the PC. The device information of the MFP 101 is managed by Management Information Base (MIB).

"Community" is a concept used for grouping devices to be managed. Communication can be performed in the case that the SNMP manager and SNMP agent belong to the same Community. PDU Type is information indicating the classes of a request and a response. OID is short for "object identifier", and is an identifier allocated to each piece of information managed in a tree structure in MIB. The SNMP manager can specify desired information by specifying OID.

In the example illustrated in FIG. 6A, it is a condition that Public is specified as Community. Also, it is a condition that GetRequest is specified as PDU Type. Also, it is a condition that hrDeviceStatus is specified as OID1. Request ID and Error Status may be anything.

FIG. 6B illustrates the data of the proxy response packet transmitted in step S411. The sender MAC address of the received packet is described in the sending destination MAC address in Item 613. Its own MAC address is described in the sender MAC address in Item 614.

The IP Version of the received packet is described in the IP Version in Item 615. The sender IP address of the received packet is described in the sending destination IP address in Item 616. Its own IP address is described in the sender IP address in Item 617.

The sender port number of the received packet is described in the sending destination port number in Item 618. 161 is described in the sender port number in Item 619.

Public is described in the Community in Item 620. GetResponse is described in the PDU Type in Item 621. The Request ID of the received packet is described in the Request ID in Item 622. No Error is described in the Error Status in Item 623. hrDeviceStatus is described in the OID1 in Item 624. 0x020102 is described in the Value in Item 625.

Figure 7:
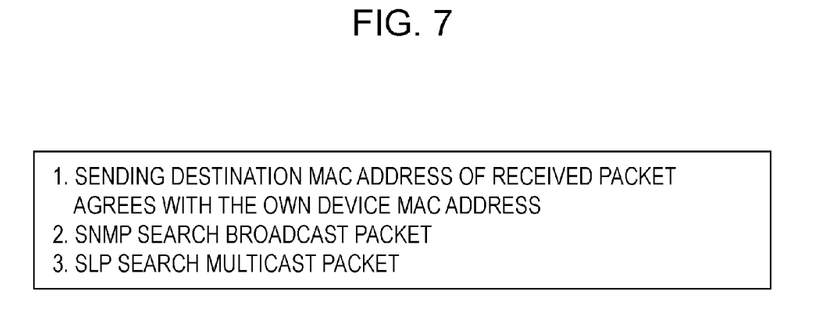
FIG. 7 is a diagram illustrating Wake-on-LAN (WOL) information according to an embodiment of the present invention.

FIG. 7 is information for determining whether or not the packet received in step S401 satisfies the conditions for WOL. Information illustrated in FIG. 7 is stored in the ROM 232. In the case of having received a packet satisfying the conditions illustrated in FIG. 7, the sub controller 230 determines that the packet which is a WOL target has been received.

The first is a condition that the sending destination MAC address of the received packet agrees with its own MAC address. The second is a condition that the received packet is a broadcast packet for SNMP search. The third is a condition that the received packet is a multicast packet for service location protocol (SLP) search. SLP is a protocol for searching for a service over a network. Those three conditions are determined by logical sum (OR). Specifically, in the case that the received packet satisfies any one of the conditions, determination is made that a packet which is a WOL target has been received.

Figure 8:
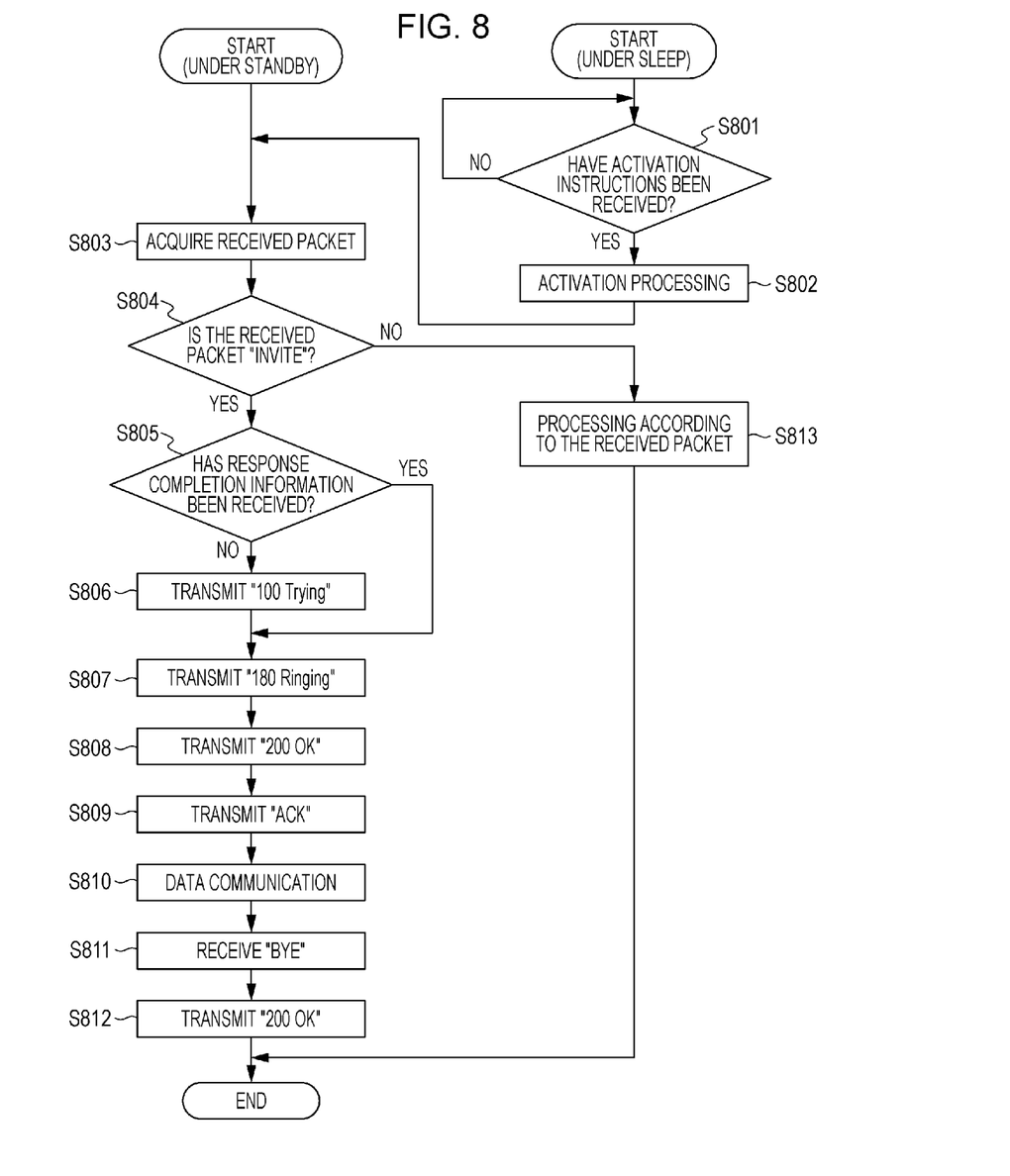
FIG. 8 is a flowchart illustrating operation of a main controller according to an embodiment of the present invention.

FIG. 8 is a flowchart for describing the operation of the MFP 101. The operations (steps) illustrated in the flowchart in FIG. 8 are realized by the CPU 211 of the main controller 210 executing the control program stored in the ROM 212.

In the case that the MFP 101 is in the sleep mode, the main controller 210 starts the processing from step S801. In the case that the MFP 101 is not in the sleep mode (in the case of the standby mode), the main controller 210 starts the processing from step S803.

In step S801, the main controller 210 determines whether or not activation has been instructed from the sub controller 230. In the case that activation has been instructed, the main controller 210 proceeds to step S802, and in the case that activation has not been instructed, awaits until activation is instructed. Activation processing to activate the main controller 210 is performed in step S802. The activation processing mentioned here may also be called a return process for returning the main controller 210 from the sleep mode to the standby mode.

In step S803, the main controller 210 acquires the received packet transferred from the sub controller 230. In step S804, the main controller 210 determines whether or not the received packet is "INVITE". In order to perform this determination, the same information as described in FIG. 6A is also stored in the main controller 210 side. In the case that the received packet is "INVITE", the main controller 210 proceeds to step S805, and in the case that the received packet is not "INVITE", proceeds to step S813.

In step S805, the main controller 210 determines whether or not the response completion information from the sub controller 230 has been received. In the case that the response completion information has been received, the main controller 210 skips step S806 and proceeds to step S807, and in the case that the response completion information has not been received, proceeds to step S806. In step S806, the main controller 210 returns "100Trying" to the sub controller 230. The response completion information has been received, whereby it can be determined that proxy response of "100Trying" by the sub controller 230 has been performed. Accordingly, "100Trying" by the main controller 210 is omitted.

In step S807, the main controller 210 transmits "180Ringing" (corresponds to step S308). In step S808, the main controller 210 transmits "200OK" (corresponds to step S310). In step S809, the main controller 210 receives "ACK" (corresponds to step S313). In step S810, the main controller 210 performs data communication (corresponds to step S314). In step S811, the main controller 210 receives "BYE" (corresponds to step S316). In step S812, the main controller 210 transmits "200OK" (corresponds to step S317).

In step S813, the main controller 210 performs processing according to the received packet. For example, in the case that the received packet is print data, the main controller 210 performs print processing using the printer 250. Also, in the case that the received packet is a reading instruction, the main controller 210 performs reading processing using the scanner 260.

As described above, upon having received the initiation request for a session ("INVITE"), the sub controller 230 performs first response ("100Trying") as to the received initiation request. Also, the sub controller 230 instructs activation of the main controller 210 in response to reception of the initiation request. The main controller 210 performs, after activation in response to the instruction from the sub controller 230, second response ("180Ringing" or "200OK") following the first response. Next, after performing the second response, the main controller 210 performs data communication using the session established between itself and the partner device.

Thus, while reducing the power consumption of the communication apparatus, data communication using the call control server can suitably be performed.

Second Embodiment

Next, a second embodiment of the present invention will be described. An example has been described in the first embodiment in which the sub controller 230 performs proxy response regarding "100Trying" alone. Conversely, an example will be described in the second embodiment in which the sub controller 230 performs proxy response regarding "100Trying" and "180Ringing". Also, a modification will also be described in which the sub controller 230 performs proxy response regarding "180Ringing" alone. The second embodiment has the same configurations as the configurations described in FIGS. 1 and 2, and accordingly, description will be omitted.

Figure 9:
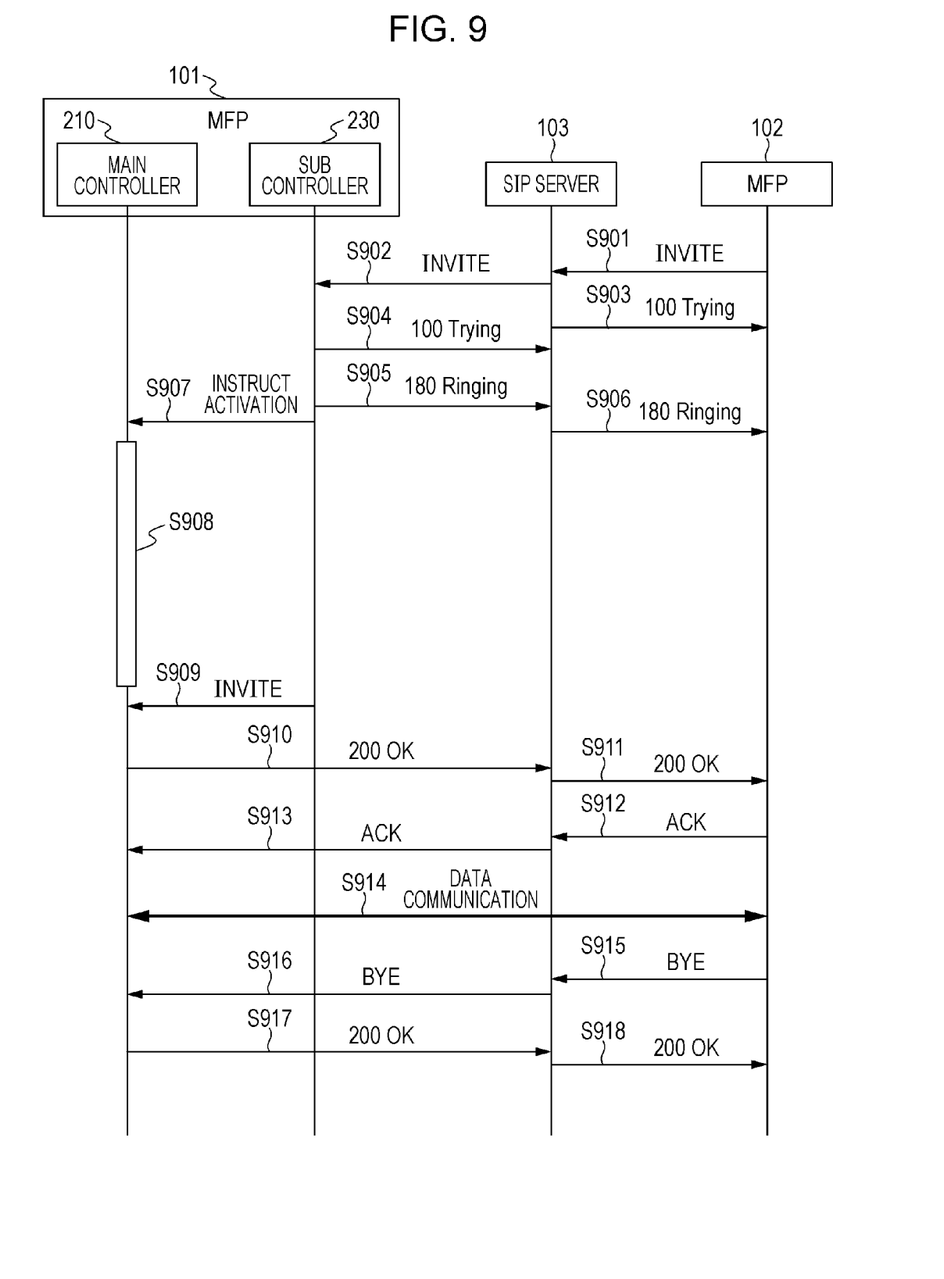
FIG. 9 is a communication sequence chart according to an embodiment of the present invention.

FIG. 9 is a diagram illustrating a communication sequence in the case of the MFP 101 in the sleep mode having received the "INVITE" from the MFP 102. The second embodiment executes a communication sequence illustrated in FIG. 9 instead of FIG. 3 in the first embodiment.

Steps S901 to S903 are the same as steps S301 to S303 in FIG. 3. The sub controller 230 of the MFP 101 which has received the "INVITE" from the SIP server 103 returns "100Trying" to the SIP server 103 in step S904, and also returns "180Ringing" to the SIP server 103 in step S905. Further, the sub controller 230 instructs activation to the main controller 210 in step S907. The main controller 210 which has received this instruction performs activation processing in step S908. Note that the response of "100Trying" by the sub controller 230 may be omitted. Also, the activation instruction in step S907 may be performed before returning "100Trying" to the SIP server 103 in step S904. Also, the activation instruction in step S907 may be performed after returning "100Trying" to the SIP server 103 in step S904, and also before returning "180Ringing" to the SIP server 103 in step S905.

The SIP server 103 which has received the "180Ringing" from the MFP 101 transfers the "180Rining" to the MFP 102 in step S906.

Upon the activation of the main controller 210 having been completed, in step S909 the sub controller 230 transfers the "INVITE" to the main controller 210. Steps S910 to S918 are the same as steps S310 to S318 in FIG. 3.

As described above, upon having received the initiation request for a session ("INVITE"), the sub controller 230 performs the first response ("100Trying" or "180Ringing") as to the received initiation request in the second embodiment. Also, the sub controller 230 instructs activation of the main controller 210 in response to reception of the initiation request. The main controller 210 performs the second response ("200OK") following the first response after activation in response to the instruction from the sub controller 230. The main controller 210 performs data communication using the session between itself and the partner device after performing the second response.

Thus, in the same way as the first embodiment, while reducing the power consumption of the communication apparatus, data communication using the call control server can suitably be performed.

Note that, though the configuration of the MFP 101 has been described in the first and second embodiments as the "main controller" and "sub controller", the main-sub relationship of the controllers is not restricted to this. Specifically, the controller 230 may be "main controller", and the controller 210 may be "sub controller". Also, an arrangement may be made where the controllers do not have a main-sub relation, and are independent from each other. Further, even in the case that the controllers are each provided to different casings, the overall including these will be referred to as the communication apparatus.

Also, though description has been made so far regarding a case where the operations of the steps in FIGS. 4 and 8 are software processes realized by using processors and memory, some steps may be configured as a hardware process. Also, one step may be executed by combining a software process and a hardware process.

Other Embodiments

Embodiments of the present invention may also be carried out by executing the following processing. Specifically, a storage medium in which software program code for realizing the functions of the above embodiments are recorded is supplied to a system or apparatus, and a computer (CPU, MPU, etc.) of the system or apparatus thereof reads out the program code stored in the storage medium.

In this case, the program code itself read out from the storage medium realizes the functions of the above embodiments, and the program code thereof and the storage medium storing this program code make up the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-114420, filed May 30, 2013, which is hereby incorporated by reference herein in its entirety.

What is claimed is:

1. A communication apparatus configured to perform data communication using a call control server, comprising:
   a first controller; and
   a second controller,
   wherein the second controller includes
      a reception unit configured to receive an initiation request for a session,
      a first response unit configured to perform first response for the initiation request that the reception unit has received, and
      an activation instruction unit configured to instruct activation of the first controller in response to reception of the initiation request by the reception unit;
   and wherein the first controller includes
      a second response unit configured to perform second response subsequent to the first response after the first controller is activated in response to the instruction by the activation instruction unit, and
      a communication controller configured to perform data communication using a session established between the communication controller and a partner device after the second response unit performs the second response.

2. The communication apparatus according to claim 1, wherein the call control server is a Session Initiation Protocol (SIP) server.

3. The communication apparatus according to claim 1, wherein the initiation request is INVITE.

4. The communication apparatus according to claim 1, wherein the first response indicates that processing in response to the initiation request is being executed.

5. The communication apparatus according to claim 1, wherein the first controller further includes
   a third response unit configured to perform third response subsequent to the second response.

6. The communication apparatus according to claim 1, wherein the second controller further includes
   a third response unit configured to perform third response subsequent to the second response.

7. The communication apparatus according to claim 1, wherein the communication apparatus performs the reception of the initiation request by the reception unit, the first response by the first response unit, and the second response by the second response unit via the call control server, and performs the data communication by the communication controller without passing through the call control server.

8. The communication apparatus according to claim 1, wherein the first controller can operate in a first power mode or in a second power mode of which the power consumption is smaller than that in the first power mode, and goes into the first power mode from the second power mode in response to the instruction by the activation instruction unit.

9. The communication apparatus according to claim 8, wherein the first controller performs the first response in the case that the reception unit has received the initiation request in a state in which the first controller operates in the first power mode.

10. The communication apparatus according to claim 1, wherein the second controller further includes
a transfer unit configured to transfer the initiation request that the reception unit has received to the first controller,
wherein the transfer unit transfers the initiation request to the first controller along with information indicating that response has been completed in the case that the first response unit has performed the first response.

11. The communication apparatus according to claim 1, wherein the communication controller receives image data using the established session.

12. The communication apparatus according to claim 1, wherein the communication apparatus is a facsimile apparatus configured to execute facsimile communication via an IP network.

13. A control method of a communication apparatus configured to perform data communication using a call control server, which includes a first controller, and a second controller, the control method comprising:
receiving, at the second controller, an initiation request for a session;
performing, at the second controller, first response as to the initiation request received in the receiving step;
instructing, at the second controller, activation of the first controller in response to reception of the initiation request in the receiving step;
performing, at the first controller, second response subsequent to the first response after activating the first controller in response to the instruction in the instructing step; and
performing, at the first controller, data communication using a session established between itself and a partner device after performing the second response in the second response.

14. A non-transitory computer readable storage medium storing a program causing a computer to execute a control method of a communication apparatus configured to perform data communication using a call control server, which includes a first controller, and a second controller, the control method comprising:
receiving, at the second controller, an initiation request for a session;
performing, at the second controller, first response as to the initiation request received in the receiving;
instructing, at the second controller, activation of the first controller in response to reception of the initiation request in the receiving;
performing, at the first controller, second response subsequent to the first response after activating the first controller in response to the instruction in the instructing; and
performing, at the first controller, data communication using a session established between itself and a partner device after performing the second response in the second response.

* * * * *